P. J. FURLONG.
Bee Hive.
No. 20,417.
Patented June 1, 1858.
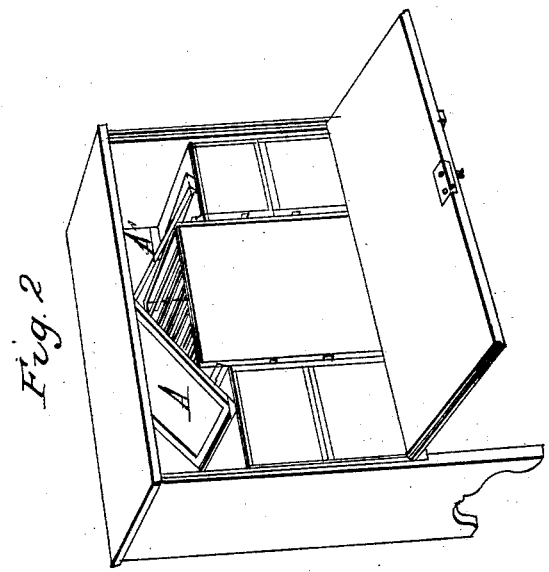
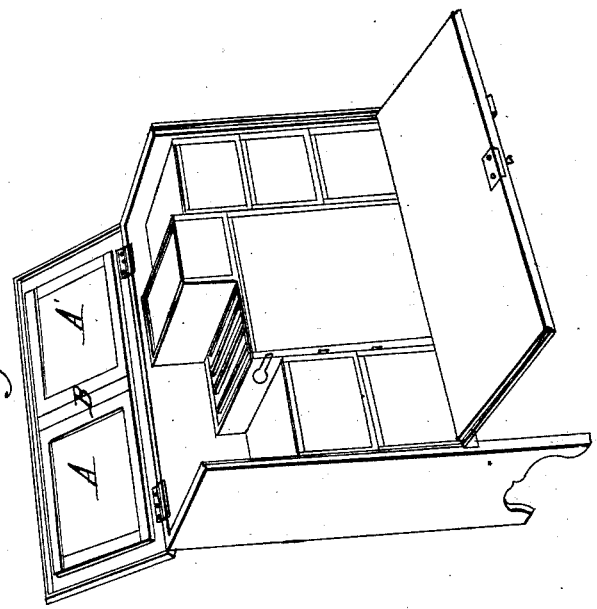

UNITED STATES PATENT OFFICE.

P. J. FURLONG, OF GALEN, NEW YORK.

BEEHIVE.

Specification of Letters Patent No. 20,417, dated June 1, 1858.

*To all whom it may concern:*

Be it known that I, PHILANDER J. FURLONG, of the town of Galen, in the county of Wayne and State of New York, have invented a new and useful Improvement in Beehives; and I do hereby declare that the following is a full, clear, and exact description of the construction and operation of the same, reference being had to the annexed drawing, making a part of this specification, in which—

Figure 1 is a perspective view of the opened chest with the two upper left hand boxes removed, and Fig. 2 a perspective view of the chest as arranged for cold weather and ready to be closed up in front for the winter.

The nature of my invention consists in the employment of a glass roof or condenser with tin conductors whereby all moisture as it rises to the top of the hive in the form of vapor is condensed and conducted out of the hive.

I construct my hive in the form of a chest with a central hive for the residence of the bees and side and top boxes for the deposit of extra honey similar to the usual combination hive; except that the side boxes are smaller. Then I leave the top of the central hive open, except slats across it to attach the comb to as shown over one half of it in Fig. 1, and in the winter I place over this central hive after removing the two top boxes a glass roof, or condenser. I make the roof or condenser similar to a window sash for each half or side of the roof; a single pane of glass sufficiently large for each half of the roof is better than several smaller lights. I attach these rooves by hinges to the under side of the top lid of the chest, as shown by A, A', in Fig. 1, and in summer, by pressing the wedge B, between them throw them up against the under surface of the lid so as not to interfere with the top boxes. In the winter I remove the two top boxes and the two upper of the side boxes and then by withdrawing the wedge B, I let the glass roofs or condensers down on to the outer edges of the central hive, with the lower ends or eaves resting in the tin conductors as shown by A, A', in Fig. 2.

C, C', in Fig. 2 indicates the location and shape of the tin conductors which pass out through the back of the hive.

One of the causes of the destruction of bees in the winter is that all moisture in the hive, as well that from the breath of the bee as from other sources, rises in the form of vapor and adhering to the top of the hive freezes there in cold nights and in warm days melts and drops down and wets the bees and then as the cold of the nights comes on they being wet are frozen to death.

The operation of my glass roof or condenser, is, that as the moisture rises to the top of the hive it adheres to the glass and there condenses and runs down on the under side of the glass past the edge of the central hive and into the tin conductors and by them is conducted outside of the hive. The consequence is that the bees remain at all times perfectly dry and are not affected by the cold.

What I claim as my invention and desire to secure by Letters Patent is—

The arrangement of the glass roof A, A', with relation to the cover of a beehive and to the conductors C, C', the whole being constructed and operated in the manner and for the purpose herein described.

PHILANDER J. FURLONG.

Witnesses:
C. D. LAWTEEN,
F. C. REED.